(12) United States Patent
Stojanovski et al.

(10) Patent No.: US 11,800,407 B2
(45) Date of Patent: Oct. 24, 2023

(54) FLEXIBLE SCOPE OF PACKET FILTERS FOR REFLECTIVE QUALITY OF SERVICE

(71) Applicant: INTEL CORPORATION, Santa Clara, CA (US)

(72) Inventors: Alexandre Saso Stojanovski, Paris (FR); Robert Zaus, Munich (DE)

(73) Assignee: APPLE INC., Cupertino, CA (US)

( * ) Notice: Subject to any disclaimer, the term of this patent is extended or adjusted under 35 U.S.C. 154(b) by 334 days.

(21) Appl. No.: 17/265,686

(22) PCT Filed: Aug. 8, 2019

(86) PCT No.: PCT/US2019/045656
§ 371 (c)(1),
(2) Date: Feb. 3, 2021

(87) PCT Pub. No.: WO2020/036802
PCT Pub. Date: Feb. 20, 2020

(65) Prior Publication Data
US 2021/0306912 A1 Sep. 30, 2021

Related U.S. Application Data

(60) Provisional application No. 62/718,258, filed on Aug. 13, 2018.

(51) Int. Cl.
*H04W 28/24* (2009.01)
*H04W 76/10* (2018.01)
*H04L 69/22* (2022.01)

(52) U.S. Cl.
CPC ............ *H04W 28/24* (2013.01); *H04L 69/22* (2013.01); *H04W 76/10* (2018.02)

(58) Field of Classification Search
CPC ............ H04W 28/24; H04W 28/0268; H04W 28/0967; H04W 28/16; H04W 76/10; H04W 72/543; H04L 69/22
See application file for complete search history.

(56) References Cited

U.S. PATENT DOCUMENTS 7,649,843 B2 1/2010 Shanley et al.
2010/0260129 A1 10/2010 Ulupinar et al.
(Continued)

FOREIGN PATENT DOCUMENTS

JP 2015057901 A 3/2015
WO 2018070689 A1 4/2018
WO 2018130741 A1 7/2018

OTHER PUBLICATIONS

PCT/US2019/045656, International Search Report and Written Opinion, dated Nov. 26, 2019, 11 pages.

*Primary Examiner* — Kent Krueger
(74) *Attorney, Agent, or Firm* — Dorsey & Whitney LLP

(57) ABSTRACT

Systems and methods provide for controlling the derivation of QoS rules in the UE by flexibly defining the scope of packet header fields over which packet filter derivation is performed. The scope of packet header fields for derivation of QoS rules may be provided by the network to the UE upon PDU Session establishment or modification. For PDU Session of IP type, the network indicates to the UE whether the scope of RQoS includes both the Source/Destination IP address pair and the Source/Destination Port numbers, or only the former. For PDU Session of Ethernet type, the network indicates to the UE whether the scope of RQoS includes both the Source/Destination MAC address pair and the IEEE 802.1Q tag, or only the former. The UE may indicate to the network whether it supports the flexible scope of packet filters for RQoS for a PDU session.

10 Claims, 6 Drawing Sheets

(56) References Cited

U.S. PATENT DOCUMENTS

| | | | | |
|---|---|---|---|---|
| 2018/0234876 A1* | 8/2018 | Jheng | ................... | H04W 28/26 |
| 2018/0376384 A1* | 12/2018 | Youn | ................. | H04W 36/0022 |
| 2019/0116517 A1* | 4/2019 | Liu | ...................... | H04W 28/24 |
| 2019/0116518 A1* | 4/2019 | Stojanovski | ............ | H04L 67/14 |
| 2019/0306744 A1* | 10/2019 | Huang-Fu | ............. | H04W 72/23 |
| 2020/0037386 A1* | 1/2020 | Park | ..................... | H04W 80/10 |
| 2020/0137675 A1* | 4/2020 | Park | ................... | H04W 68/005 |
| 2020/0275302 A1* | 8/2020 | Youn | ................. | H04W 28/0268 |
| 2022/0086682 A1* | 3/2022 | Watfa | .................... | H04W 28/02 |
| 2022/0182861 A1* | 6/2022 | Youn | ...................... | H04W 8/26 |

* cited by examiner

FLEXIBLE SCOPE OF PACKET FILTERS FOR REFLECTIVE QUALITY OF SERVICE

CROSS-REFERENCE TO RELATED APPLICATIONS

This application is a national stage filing under 35 U.S.C. § 371 of International Patent Application No. PCT/US2019/045656, filed Aug. 8, 2019 which claims the benefit of U.S. Provisional Application No. 62/718,258, filed Aug. 13, 2018, each of which is hereby incorporated by reference herein in its entirety.

TECHNICAL FIELD

This application relates generally to wireless communication systems, and more specifically to quality of service (QoS) flows.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

DETAILED DESCRIPTION

Figure 1:
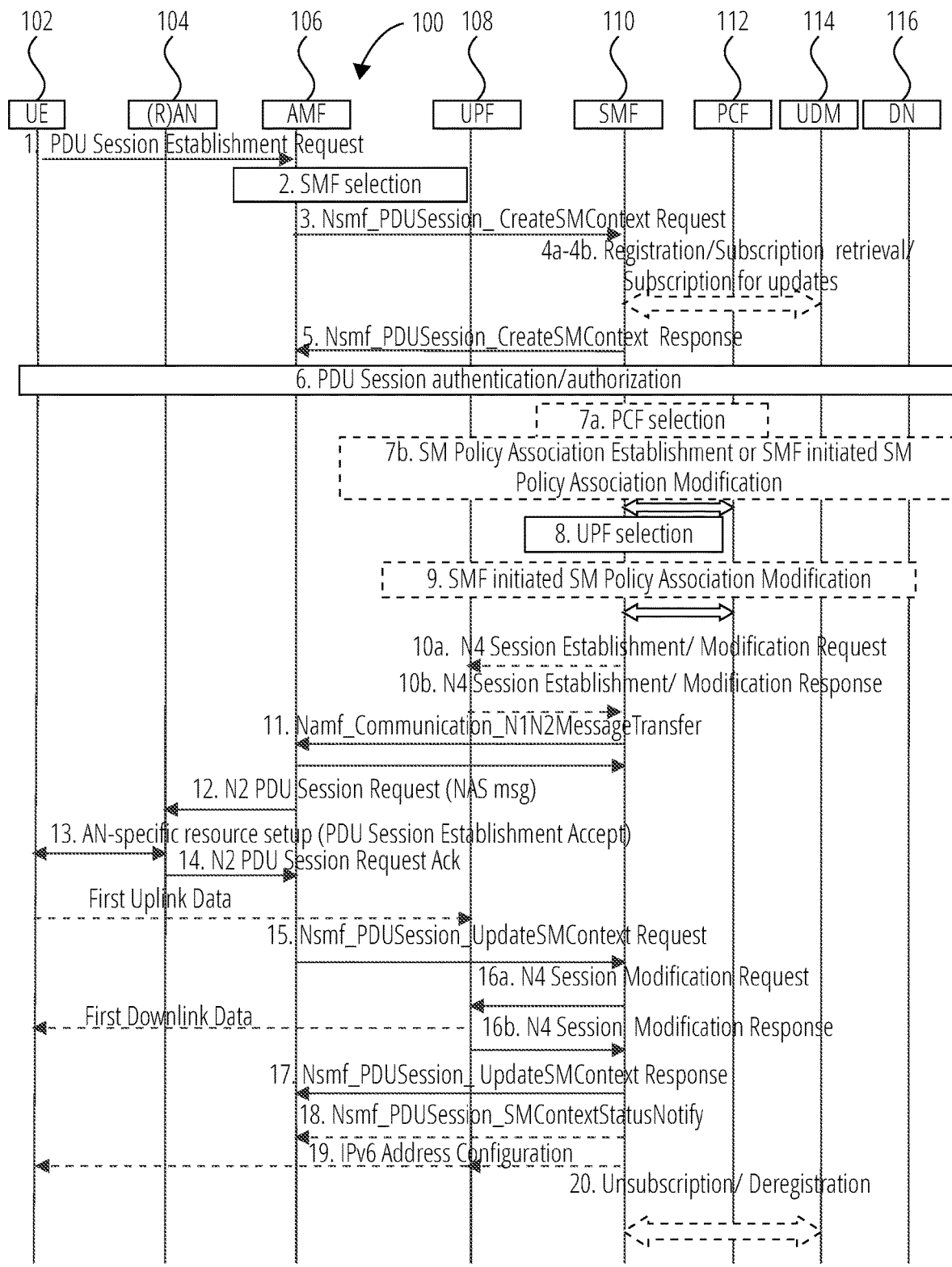
FIG. 1 illustrates a call flow in accordance with one embodiment.

The 5G QoS model is based on QoS flows. The 5G QoS model supports both QoS flows that require guaranteed flow bit rate (GBR QoS flows) and QoS flows that do not require guaranteed flow bit rate (Non-GBR QoS flows). The 5G QoS model also supports Reflective QoS, where a UE indicates in a UE 5GSM Core Network Capability of a PDU Session Establishment Request whether the UE supports reflective QoS, "IP", "IPv4", "IPv6", "IPv4v6" or "Ethernet" PDU Session Type, and Multi-homed IPv6 PDU Session (only if the Requested PDU Type was set to "IPv6" or "IPv4v6"). RQoS relies on user plane packets to allow the UE to derive packet filters to be used for QoS flow binding of uplink (UL) packets. The binding of UL packets to QoS flows determines the QoS with which the packets will be handled in the uplink.

Reflective QoS enables the UE to map UL user plane traffic to QoS flows without session management function (SMF) provided QoS rules and it applies for internet protocol (IP) protocol data unit (PDU) session and Ethernet PDU session. This is achieved by creating UE derived QoS rules in the UE based on the received downlink (DL) traffic. The UE derived QoS rule includes the following parameters: one UL Packet Filter (in the Packet Filter Set; QoS flow identifier (QFI); and a precedence value.

For PDU Session of IP type the UL Packet Filter is derived based on the received DL packet as follows. When Protocol identifier (ID)/Next Header is set to transmission control protocol (TCP) or user datagram protocol (UDP), by using the source and destination IP addresses, source and destination port numbers, and the Protocol ID/Next Header field itself. When Protocol ID/Next Header is set to encapsulating security protocol (ESP), by using the source and destination IP addresses, the Security Parameter Index, and the Protocol ID/Next Header field itself. If the received DL packet is an IPSec protected packet, and an uplink IPSec SA corresponding to a downlink IPSec SA of the SPI in the DL packet exists, then the UL Packet Filter contains an SPI of the uplink IPSec SA.

For PDU sessions of IP type the use of Reflective QoS is restricted to service data flows for which Protocol ID/Next Header is set to TCP, UDP or ESP. The UE does not verify whether the downlink packets with RQI indication match the restrictions on Reflective QoS.

For PDU Session of Ethernet type the UL Packet Filter is derived based on the received DL packet by using the source and destination MAC addresses, the Ethertype on received DL packet is used as Ethertype for UL packet. In the case of presence of 802.1Q, the VID and PCP in IEEE 802.1Q header(s) of the received DL packet is also used as the VID and PCP field for the UL Packet Filter. When double 802.1Q tagging is used, only the outer (S-TAG) is taken into account for the UL Packet Filter derivation. For PDU Sessions of Ethernet type the use of Reflective QoS is restricted to service data flows for which 802.1Q tagging is used.

The QFI of the UE derived QoS rule is set to the value received in the DL packet. When Reflective QoS is activated the precedence value for all UE derived QoS rules is set to a standardized value.

The present disclosure is related to the cases when the Protocol ID/Next Header field is set to TCP or UDP, the creation of packet filters for derived QoS rules is scoped on the whole 5-tuple, e.g., Source IP address is swapped with Destination IP address, and the Source Port number is swapped with the Destination Port number.

The fixed scope of the packet filters for derived QoS rules restricts the usability of Reflective QoS. Indeed, with this fixed scope definition it is implied that Reflective QoS can be used only in cases where the outbound and inbound traffic flows are using symmetric port numbers. While this may be true for some traffic flows (e.g., TCP) it is not the case for some others (e.g., peer-to-peer communication over UDP).

Another potential issue with the fixed scope of RQoS rules is that it may result in a huge number of derived QoS rules because all the dynamically created packet filters have a very narrow scope (e.g., they only apply to the traffic flow that matches the whole 5-tuple). The expiry of derived QoS rules being controlled by a fixed timer value, in case of high-bandwidth communication with short-lived traffic flows the UE can easily enter a situation with thousands of concurrent derived QoS rules. The huge number of RQoS rules may become a problem both in terms of memory storage in the UE and in terms of processing time when the uplink packet is being bound to a QoS flow.

According to certain embodiments herein, in many real life scenarios it will be sufficient to derive QoS rules for Reflective QoS by swapping the Source and Destination IP address only. For example, consider the scenario where the Mobile Network Operator (MNO) has a Service Level Agreement with a third party stipulating that all communications between the UE and the third party's servers get preferential QoS treatment. In this scenario the MNO may maintain a list of IP addresses corresponding to the third party's servers and whenever a DL packet with a Source IP address matching the list arrives at the UPF, the UPF will start setting the Reflective QoS Indication in the N3/N9 encapsulation header, which is eventually conveyed to the UE. The number of derived QoS filters in the UE will be proportional to the number of servers with which it communicates in parallel, regardless of the number of Service Data Flows that the UE uses concurrently.

Another example scenario is online shopping. The MNO may have an SLA with the third party (online shopping company) stipulating that best-effort QoS be used while the user is browsing the merchandise and filling in the cart, followed by prioritized QoS handling once the user proceeds to payment. To make this scenario work while using Reflective QoS, the MNO can keep a list of IP addresses corresponding only to the third party's servers that handle the payment transactions.

Similar benefits can be expected with PDU Sessions of Ethernet type when IEEE 802.1Q tagging is used. In certain such embodiments, the network can decide whether the derived QoS rules should be applied on both the Source/Destination MAC address pair and the IEEE 802.1Q tag, or only on the former (i.e., only on the Source/Destination MAC address pair).

By using a fixed scope for derivation of QoS rules based on both the Source and Destination IP address fields and the Source and Destination Port numbers, the UE can easily run into a situation with thousands of concurrent derived QoS rules. The huge number of RQoS rules may become a problem both in terms of memory storage in the UE and in terms of processing time when the uplink packet is being bound to a QoS flow.

Thus, according to various embodiments, the UE may be able to adapt the scope of the packet filters for RQoS according to an indication provided by the network. In particular, upon PDU Session establishment of IP type, the network indicates to the UE whether the scope of RQoS includes both Source/Destination IP address pair and the Source/Destination Port number pair, or only the former. Upon PDU Session establishment of Ethernet type the network indicates to the UE whether the scope of RQoS includes both Source/Dest MAC address pair and the IEEE 802.1Q tag, or only the former.

By reducing the scope of derived QoS rules to only the Source and Destination IP address fields, the number of derived packet filters in the UE will be much smaller than current solution(s). This is beneficial both in terms of memory/storage resource reduction/conservation at the UE and in terms of processing resources (e.g., processing time) when the uplink packet is being bound to a QoS flow.

Certain embodiments disclosed herein may be implemented in a PDU Session Establishment procedure. A PDU Session establishment may correspond, for example, to one of a UE initiated PDU Session Establishment procedure, a UE initiated PDU Session handover between 3GPP and non-3GPP, a UE initiated PDU Session handover from EPS to 5GS, or a Network triggered PDU Session Establishment procedure.

By way of example, FIG. 1 illustrates a call flow 100 for a UE requested PDU session establishment procedure. The call flow 100 shown FIG. 1 includes messages between a UE 102, a (radio) access network (shown as ((R)AN 104), an access and mobility management function (shown as AMF 106), a user plane function (shown as UPF 108), a session management function (shown as SMF 110), a policy control function (shown as PCF 112), a unified data management function (shown as UDM 114), and a data network (shown as DN 116). In this example, the call flow in TS 23.502 clause 4.3.2.2 (PDU Session Establishment) is used as a basis, and persons skilled in the art will understand that the description below only provides a summary and further details may be found in TS 23.502.

With reference to operation 1. of FIG. 1, from UE to AMF: NAS Message (S-NSSAI(s), DNN, PDU Session ID, Request type, Old PDU Session ID, N1 SM container (PDU Session Establishment Request)). In order to establish a new PDU Session, the UE generates a new PDU Session ID. The UE initiates the UE Requested PDU Session Establishment procedure by the transmission of a NAS message containing a PDU Session Establishment Request within the N1 SM container. The PDU Session Establishment Request includes a PDU session ID, Requested PDU SessionType, a Requested SSC mode, 5GSM Capability PCO, SM PDU DN Request Container, Number Of Packet Filters. The Request Type indicates "Initial request" if the PDU Session Establishment is a request to establish a new PDU Session and indicates "Existing PDU Session" if the request refers to an existing PDU Session switching between 3GPP access and non-3GPP access or to a PDU Session handover from an existing PDN connection in EPC. If the request refers to an existing PDN connection in EPC, the S-NSSAI is set as described in TS 23.501 clause 5.15.7.2.

The 5GSM Core Network Capability is provided by the UE and handled by SMF as defined in TS 23.501 [2] clause 5.4.4b. The 5GSM Capability also includes the UE Integrity Protection Maximum Data Rate. Additionally, the UE may indicate to the SMF in the 5GSM Capability IE of the PDU Session Establishment Request message that the UE supports the feature "flexible scope of packet filters for RQoS".

The Number Of Packet Filters indicates the number of supported packet filters for signaled QoS rules for the PDU Session that is being established. The number of packet filters indicated by the UE is valid for the lifetime of the PDU Session. For presence condition, see TS 24.501.

With reference to operation 2. of FIG. 1, the AMF determines that the message corresponds to a request for a new PDU Session based on that Request Type indicates "initial request" and that the PDU Session ID is not used for any existing PDU Session(s) of the UE. If the NAS message does not contain an S-NSSAI, the AMF determines a default S-NSSAI for the requested PDU Session either according to the UE subscription, if it contains only one default S-NSSAI, or based on operator policy. When the NAS Message contains an S-NSSAI but it does not contain a DNN, the AMF determines the DNN for the requested PDU Session by selecting the default DNN for this S-NSSAI if the default DNN is present in the UE's Subscription Information; otherwise the serving AMF selects a locally configured DNN for this S-NSSAI. If the DNN provided by the UE is not supported by the network and AMF can not select an SMF by querying NRF, based on operator policy, the AMF shall reject the NAS Message containing PDU Session Establishment Request from the UE with an appropriate cause.

With reference to operation 3. of FIG. 1, from AMF to SMF: Either Nsmf_PDUSession_CreateSMContext Request (SUPI, DNN, S-NSSAI(s), PDU Session ID, AMF ID, Request Type, PCF ID, Priority Access, N1 SM container (PDU Session Establishment Request), User location information, Access Type, PEI, GPSI, UE presence in LADN service area, Subscription For PDU Session Status Notification, DNN Selection Mode) or Nsmf_PDUSession_UpdateSMContext Request (SUPI, DNN, S-NSSAI(s), PDU Session ID, AMF ID, Request Type, N1 SM container (PDU Session Establishment Request), User location information, Access Type, RAT type, PEI). If the AMF does not have an association with an SMF for the PDU Session ID provided by the UE (e.g. when Request Type indicates "initial request"), the AMF invokes the Nsmf_PDUSession_CreateSMContext Request, but if the AMF already has an association with an SMF for the PDU Session ID provided by the UE (e.g. when Request Type indicates "existing PDU Session"), the AMF invokes the Nsmf_PDUSession_UpdateSMContext Request. The AMF sends the S-NSSAI from the Allowed NSSAI to the SMF. For roaming scenario, the AMF also sends the corresponding S-NSSAI from the Mapping Of Allowed NSSAI to the SMF. The AMF may include a PCF ID in the Nsmf_PDUSession_CreateSMContext Request. This PCF ID identifies the H-PCF in the non-roaming case and the V-PCF in the local breakout roaming case. In certain embodiments herein, the AMF may include the value of the 5GSM Capability IE of the PDU Session Establishment Request message that indicates that the UE supports the feature "flexible scope of packet filters for RQoS".

With reference to operations 4a-4b. of FIG. 1, the process includes Registration/Subscription retrieval/Subscription for updates.

With reference to operation 5. of FIG. 1, From SMF to AMF: Either Nsmf_PDUSession_CreateSMContext Response(Cause, SM Context ID or N1 SM container (PDU Session Reject(Cause))) or an Nsmf_PDUSession_UpdateSMContext Response depending on the request received in operation 3.

Operation 6. of FIG. 1 includes an optional PDU Session authentication/authorization.

Operations 7a. and 7b. of FIG. 1 include PCF selection and SM Policy Association Establishment or SMF initiated SM Policy Association Modification.

Operation 8. in FIG. 1 UPF selection.

Operation 9. in FIG. 1 includes SMF initiated SM Policy Association Modification.

Operations 10a. and 10b. in FIG. 1 includes N4 Session Establishment/Modification Request, and N4 Session Establishment/Modification Response.

With reference to operation 11. in FIG. 1, SMF to AMF: Namf_Communication_N1N2MessageTransfer (PDU Session ID, N2 SM information (PDU Session ID, QFI(s), QoS Profile(s), CN Tunnel Info, S-NSSAI from the Allowed NSSAI, Session-AMBR, PDU Session Type, User Plane SecurityEnforcement information, UE Integrity Protection Maximum Data Rate), N1 SM container (PDU Session Establishment Accept (QoS Rule(s) and QoS flow level QoS parameters if needed for the QoS flow(s) associated with the QoS rule(s), selected SSC mode, S-NSSAI(s), DNN, allocated IPv4 address, interface identifier, Session-AMBR, selected PDU Session Type, Reflective QoS Timer (if available), Reflective QoS rule scope, P-CSCF address(es)))). If multiple UPFs are used for the PDU Session, the CN Tunnel Info contain tunnel information related with the UPF that terminates N3. In certain embodiments herein, the Reflective QoS rule scope indicates the following: for PDU Session of IP typeit indicates to the UE whether the scope of RQoS includes both Source/Dest IP address pair and the Source/Dest Port number pair, or only the former; and for PDU Session of Ethernet typeit indicates to the UE whether the scope of RQoS includes both Source/Dest MAC address pair and the IEEE 802.1Q tag, or only the former.

The N2 SM information carries information that the AMF shall forward to the (R)AN which includes: the CN Tunnel Info corresponds to the Core Network address of the N3 tunnel corresponding to the PDU Session; one or multiple QoS profiles and the corresponding QFIs can be provided to the (R)AN. This is further described in TS 23.501 clause 5.7; PDU Session ID may be used by AN signaling with the UE to indicate to the UE the association between (R)AN resources and a PDU Session for the UE; a PDU Session is associated to an S-NSSAI and a DNN, wherein the S-NSSAI provided to the (R)AN, is the S-NSSAI with the value for the serving PLMN; User Plane SecurityEnforcement information is determined by the SMF as described in clause 5.10.3 of TS 23.501; and if the User Plane Security Enforcement information indicates that Integrity Protection is "Preferred" or "Required", the SMF also includes the UE Integrity Protection Maximum Data Rate as received in the 5GSM Capability.

The N1 SM container contains the PDU Session Establishment Accept that the AMF shall provide to the UE. If the UE requested P-CSCF discovery then the message shall also include the P-CSCF IP address(es) as determined by the SMF. The PDU Session Establishment Accept includes S-NSSAI from the Allowed NSSAI. For roaming scenario, the PDU Session Establishment Accept also includes corresponding S-NSSAI from the Mapping Of Allowed NSSAI that SMF received in operation 3. Multiple QoS Rules, QoS flow level QoS parameters if needed for the QoS flow(s) associated with those QoS rule(s) and QoS Profiles may be included in the PDU Session Establishment Accept within the N1 SM and in the N2 SM information. The Namf_Communication_N1N2MessageTransfer contains the PDU Session ID allowing the AMF to know which access towards the UE to use.

With reference to operation 12. in FIG. 1, AMF to (R)AN: N2 PDU Session Request (N2 SM information, NAS message (PDU Session ID, N1 SM container (PDU Session Establishment Accept))). The AMF sends the NAS message containing PDU Session ID and PDU Session Establishment Accept targeted to the UE and the N2 SM information received from the SMF within the N2 PDU Session Request to the (R)AN.

With reference to operation 13. in FIG. 1, (R)AN to UE: The (R)AN may issue AN specific signalling exchange with the UE that is related with the information received from SMF. For example, in case of a NG-RAN, an RRC Connection Reconfiguration may take place with the UE establishing the necessary NG-RAN resources related to the QoS Rules for the PDU Session request received in operation 12.

R)AN also allocates (R)AN N3 tTunnel Info for the PDU Session. In case of Dual Connectivity, the Master RAN node may assign some (zero or more) QFIs to be setup to a Master RAN node and others to the Secondary RAN node. The AN Tunnel Info includes a tunnel endpoint for each involved (R)AN node, and the QFIs assigned to each tunnel endpoint. A QFI can be assigned to either the Master RAN node or the Secondary RAN node and not to both.

(R)AN forwards the NAS message (PDU Session ID, N1 SM container (PDU Session Establishment Accept)) provided in operation 12 to the UE. (R)AN shall only provide the NAS message to the UE if the necessary (R)AN resources are established and the allocation of (R)AN Tunnel Info are successful.

Operation 14. in FIG. 1 includes N2 PDU Session Request Ack.

After First Uplink Data, operation 15. in FIG. 1 includes AMF to SMF: Nsmf_PDUSession_UpdateSMContext Request (N2 SM information, Request Type).

With reference to operation 16a. in FIG. 1, the SMF initiates an N4 Session Modification procedure with the UPF. The SMF provides AN Tunnel Info to the UPF as well as the corresponding forwarding rules. Note that if the PDU Session Establishment Request was due to mobility between 3GPP and non-3GPP access or mobility from EPC, the downlink data path is switched towards the target access in this step. In certain embodiments herein, the SMF may inform the UPF that RQoS applies for the PDU Session for this PDU Session Establishment Request. When the SMF informs the UPF that RQoS applies for a certain PDU session, it also indicates whether for this specific PDU session the UPF shall apply the 'reduced' scope of packet filters for RQoS (i.e., whether for a PDU session of IP type just the Source/Dest IP address pair is used as packet filter, or for a PDU session of Ethernet type just the Source/Dest MAC address pair is used). For this indication, the SMF may take the support indication received from the UE into account. The UPF may use this information: to adapt the scope for the checking of UL packets; and to determine which DL packets need to be marked with an RQI.

With reference to operation 16b. in FIG. 1, the UPF provides an N4 Session Modification Response to the SMF. If multiple UPFs are used in the PDU Session, the UPF in step 16 refers to the UPF terminating N3. After this step, the UPF delivers any down-link packets (First Downlink Data) to the UE that may have been buffered for this PDU Session.

Operation 17. in FIG. 1 includes SMF to AMF: Nsmf_PDUSession_UpdateSMContext Response.

Operation 18. in FIG. 1 includes SMF to AMF: Nsmf_PDUSession_SMContextStatusNotify.

Operation 19. in FIG. 1 includes SMF to UE, via UPF: In case of PDU Session Type IPv6 or IPv4v6, the SMF generates an IPv6 Router Advertisement and sends it to the UE via N4 and the UPF.

Operation 20. in FIG. 1 includes, if the PDU Session establishment failed after operation 4, the SMF performs Unsubscription or Deregistration.

In the above procedure according to certain embodiments, the embodiments may be reflected in the content of the PDU Session Establishment Accept message (see e.g., operations 11-13). At operation 11, the Namf_Communication_N1N2MessageTransfer operation is performed by the SMF to AMF.

The Namf_Communication_N1N2MessageTransfer indicates or includes the Reflective QoS rule scope, as well as the PDU Session ID, N2 SM information (PDU Session ID, QFI(s), QoS Profile(s), CN Tunnel Info, S-NSSAI from the Allowed NSSAI, Session-AMBR, PDU Session Type, User Plane SecurityEnforcement information, UE Integrity Protection Maximum Data Rate), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es)))). If multiple UPFs are used for the PDU Session, the CN Tunnel Info contain tunnel information related with the UPF that terminates N3.

According to certain embodiments, for PDU Session of IP type the Reflective QoS rule scope indicates to the UE whether the scope of RQoS includes both Source/Dest IP address pair and the Source/Dest Port numbers, or only the former. For PDU Session of Ethernet type, the Reflective QoS rule scope indicates to the UE whether the scope of RQoS includes both Source/Dest MAC address pair and the IEEE 802.1Q tag, or only the former.

Additionally, in operations 1 and 3, the UE may indicate to the SMF in the PDU Session Establishment Request message (e.g., in the 5GSM Capability information element) that the UE supports the feature "flexible scope of packet filters for RQoS."

Furthermore, when the SMF informs the UPF that RQoS applies for a certain PDU session (see e.g., operation 16a), it also indicates whether for this specific PDU session the UPF is to apply the 'reduced' scope of packet filters for RQoS (e.g., whether for a PDU session of IP type just the Source/Dest IP address pair is used as packet filter or for a PDU session of Ethernet type just the Source/Dest MAC address pair is used). For this indication, the SMF may take the support indication received from the UE into account. In certain embodiments the UPF uses this information: to adapt the scope for the checking of UL packets; and/or to determine which DL packets need to be marked with an RQI.

With respect to the UPF adapting the scope for the checking of UL packets, the UPF is checking the UL packets sent by the UE to verify whether the UE is behaving in a compliant way, e.g., whether the is including the QFI applicable to the RQoS service data flow (SDF) only in those UL packets that are matching the respective packet filter(s). For this task, the UPF may need to know whether to perform the check based on the reduced scope or the full scope of the packet filter(s). If the UE is using the QFI for other packets, the UPF may discard the respective packets.

With respect to the UPF determining which DL packets need to be marked with an RQI, as described above, the SDFs occurring during a communication session between the UE and some servers in the network can be described either by a single packet filter of reduced scope (e.g., Source/Dest IP address pair only), or by several packet filters of the full scope (e.g., including Source/Dest IP address pair and Source/Dest Port numbers). For the full scope case, the UPF may need to ensure that for each of the different Source/Dest Port number pairs used during the communication session, the UPF marks one or more DL packets with the RQI so that the UE creates corresponding UL packet filters for each of these pairs. Whereas, for the reduced scope case, the it may be sufficient for the UPF to mark one or more DL packets per Source/Dest IP address pair.

One example embodiment includes a method for controlling the derivation of QoS rules in the UE by flexibly defining the scope of packet header fields over which packet filter derivation is performed. In certain such embodiments, the scope of packet header fields for derivation of QoS rules is provided by the network to the UE upon PDU Session establishment or modification. For PDU Session of IP type, the network indicates to the UE whether the scope of RQoS includes both the Source/Dest IP address pair and the Source/Dest Port number, or only the former. For PDU Session of Ethernet type, the network indicates to the UE whether the scope of RQoS includes both the Source/Dest MAC address pair and the IEEE 802.1Q tag, or only the former. In certain embodiments, the UE indicates to the network whether it supports the flexible scope of packet filters for RQoS for a PDU session, whereby the network decides whether to use the flexible scope of packet filters for RQoS for a PDU session at least partly based on the receipt of the support indication from the UE.

Figure 2:
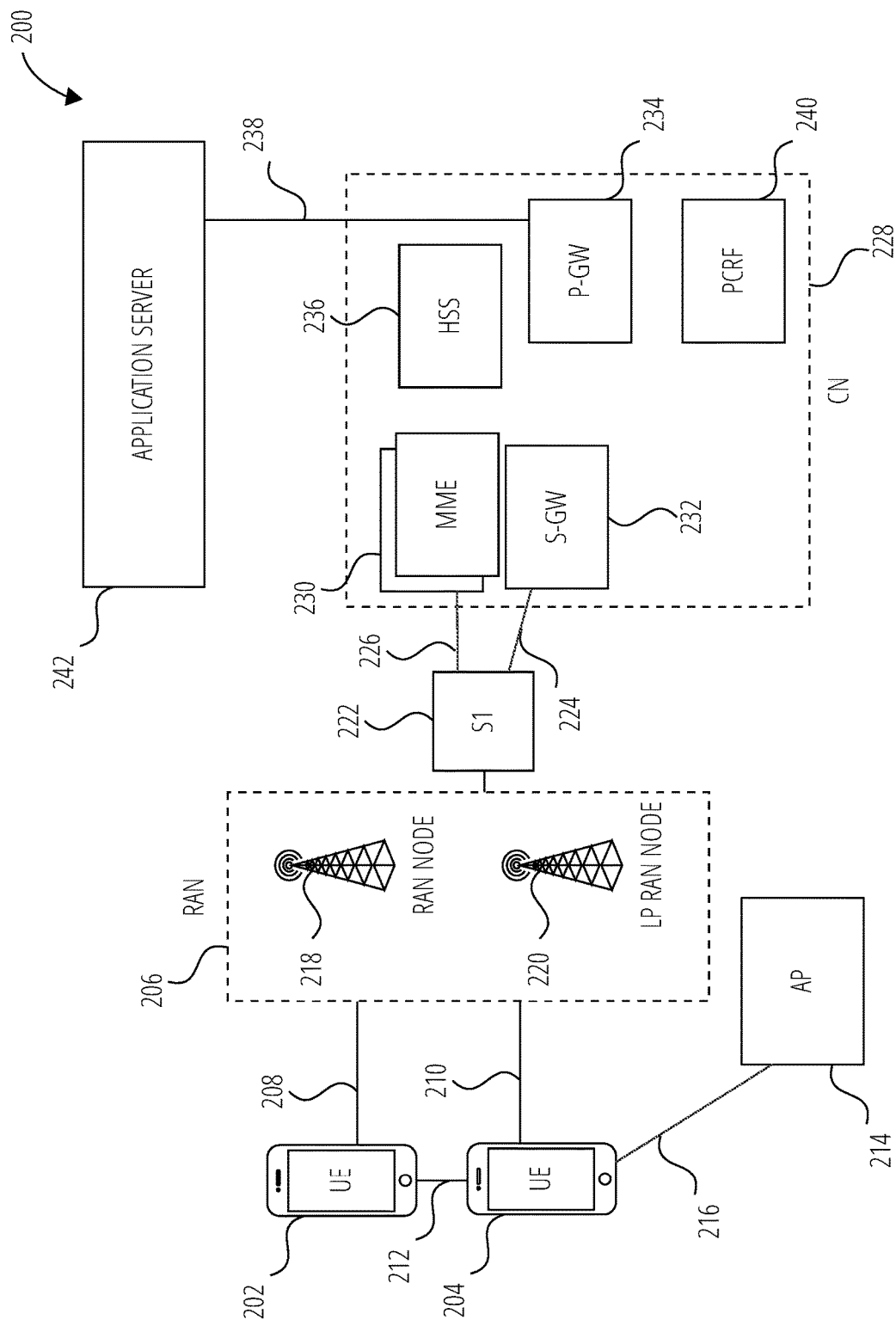
FIG. 2 illustrates a system in accordance with one embodiment.

FIG. 2 illustrates an architecture of a system 200 of a network in accordance with some embodiments. The system 200 includes one or more user equipment (UE), shown in this example as a UE 202 and a UE 204. The UE 202 and the UE 204 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 202 and the UE 204 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 202 and the UE 204 may be configured to connect, e.g., communicatively couple, with a radio access network (RAN), shown as RAN 206. The RAN 206 may be, for example, an Evolved Universal Mobile Telecommunications System (UMTS) Terrestrial Radio Access Network (E-UTRAN), a NextGen RAN (NG RAN), or some other type of RAN. The UE 202 and the UE 204 utilize connection 208 and connection 210, respectively, each of which comprises a physical communications interface or layer (discussed in further detail below); in this example, the connection 208 and the connection 210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 202 and the UE 204 may further directly exchange communication data via a ProSe interface 212. The ProSe interface 212 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 204 is shown to be configured to access an access point (AP), shown as AP 214, via connection 216. The connection 216 can comprise a local wireless connection, such as a connection consistent with any IEEE 802.11 protocol, wherein the AP 214 would comprise a wireless fidelity (WiFi®) router. In this example, the AP 214 may be connected to the Internet without connecting to the core network of the wireless system (described in further detail below).

The RAN 206 can include one or more access nodes that enable the connection 208 and the connection 210. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 206 may include one or more RAN nodes for providing macrocells, e.g., macro RAN node 218, and one or more RAN nodes for providing femtocells or picocells (e.g., cells having smaller coverage areas, smaller user capacity, or higher bandwidth compared to macrocells), e.g., a low power (LP) RAN node such as LP RAN node 220.

Any of the macro RAN node 218 and the LP RAN node 220 can terminate the air interface protocol and can be the first point of contact for the UE 202 and the UE 204. In some embodiments, any of the macro RAN node 218 and the LP RAN node 220 can fulfill various logical functions for the RAN 206 including, but not limited to, radio network controller (RNC) functions such as radio bearer management, uplink and downlink dynamic radio resource management and data packet scheduling, and mobility management.

In accordance with some embodiments, the UE 202 and the UE 204 can be configured to communicate using Orthogonal Frequency-Division Multiplexing (OFDM) communication signals with each other or with any of the macro RAN node 218 and the LP RAN node 220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 218 and the LP RAN node 220 to the UE 202 and the UE 204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements;

in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 202 and the UE 204. The physical downlink control channel (PDCCH) may carry information about the transport format and resource allocations related to the PDSCH channel, among other things. It may also inform the UE 202 and the UE 204 about the transport format, resource allocation, and H-ARQ (Hybrid Automatic Repeat Request) information related to the uplink shared channel. Typically, downlink scheduling (assigning control and shared channel resource blocks to the UE 204 within a cell) may be performed at any of the macro RAN node 218 and the LP RAN node 220 based on channel quality information fed back from any of the UE 202 and UE 204. The downlink resource assignment information may be sent on the PDCCH used for (e.g., assigned to) each of the UE 202 and the UE 204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 206 is communicatively coupled to a core network (CN), shown as CN 228—via an S1 interface 222. In embodiments, the CN 228 may be an evolved packet core (EPC) network, a NextGen Packet Core (NPC) network, or some other type of CN. In this embodiment the S1 interface 222 is split into two parts: the S1-U interface 224, which carries traffic data between the macro RAN node 218 and the LP RAN node 220 and a serving gateway (S-GW), shown as S-GW 232, and an S1-mobility management entity (MME) interface, shown as S1-MME interface 226, which is a signaling interface between the macro RAN node 218 and LP RAN node 220 and the MME(s) 230.

In this embodiment, the CN 228 comprises the MME(s) 230, the S-GW 232, a Packet Data Network (PDN) Gateway (P-GW) (shown as P-GW 234), and a home subscriber server (HSS) (shown as HSS 236). The MME(s) 230 may be similar in function to the control plane of legacy Serving General Packet Radio Service (GPRS) Support Nodes (SGSN). The MME(s) 230 may manage mobility aspects in access such as gateway selection and tracking area list management. The HSS 236 may comprise a database for network users, including subscription-related information to support the network entities' handling of communication sessions. The CN 228 may comprise one or several HSS 236, depending on the number of mobile subscribers, on the capacity of the equipment, on the organization of the network, etc. For example, the HSS 236 can provide support for routing/roaming, authentication, authorization, naming/addressing resolution, location dependencies, etc.

The S-GW 232 may terminate the S1 interface 222 towards the RAN 206, and routes data packets between the RAN 206 and the CN 228. In addition, the S-GW 232 may be a local mobility anchor point for inter-RAN node handovers and also may provide an anchor for inter-3GPP mobility. Other responsibilities may include lawful intercept, charging, and some policy enforcement.

The P-GW 234 may terminate an SGi interface toward a PDN. The P-GW 234 may route data packets between the CN 228 (e.g., an EPC network) and external networks such as a network including the application server 242 (alternatively referred to as application function (AF)) via an Internet Protocol (IP) interface (shown as IP communications interface 238). Generally, an application server 242 may be an element offering applications that use IP bearer resources with the core network (e.g., UMTS Packet Services (PS) domain, LTE PS data services, etc.). In this embodiment, the P-GW 234 is shown to be communicatively coupled to an application server 242 via an IP communications interface 238. The application server 242 can also be configured to support one or more communication services (e.g., Voice-over-Internet Protocol (VoIP) sessions, PTT sessions, group communication sessions, social networking services, etc.) for the UE 202 and the UE 204 via the CN 228.

The P-GW 234 may further be a node for policy enforcement and charging data collection. A Policy and Charging Enforcement Function (PCRF) (shown as PCRF 240) is the policy and charging control element of the CN 228. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 240 may be communicatively coupled to the application server 242 via the P-GW 234. The application server 242 may signal the PCRF 240 to indicate a new service flow and select the appropriate Quality of Service (QoS) and charging parameters. The PCRF 240 may provision this rule into a Policy and Charging Enforcement Function (PCEF) (not shown) with the appropriate traffic flow template (TFT) and QoS class of identifier (QCI), which commences the QoS and charging as specified by the application server 242.

Figure 3:
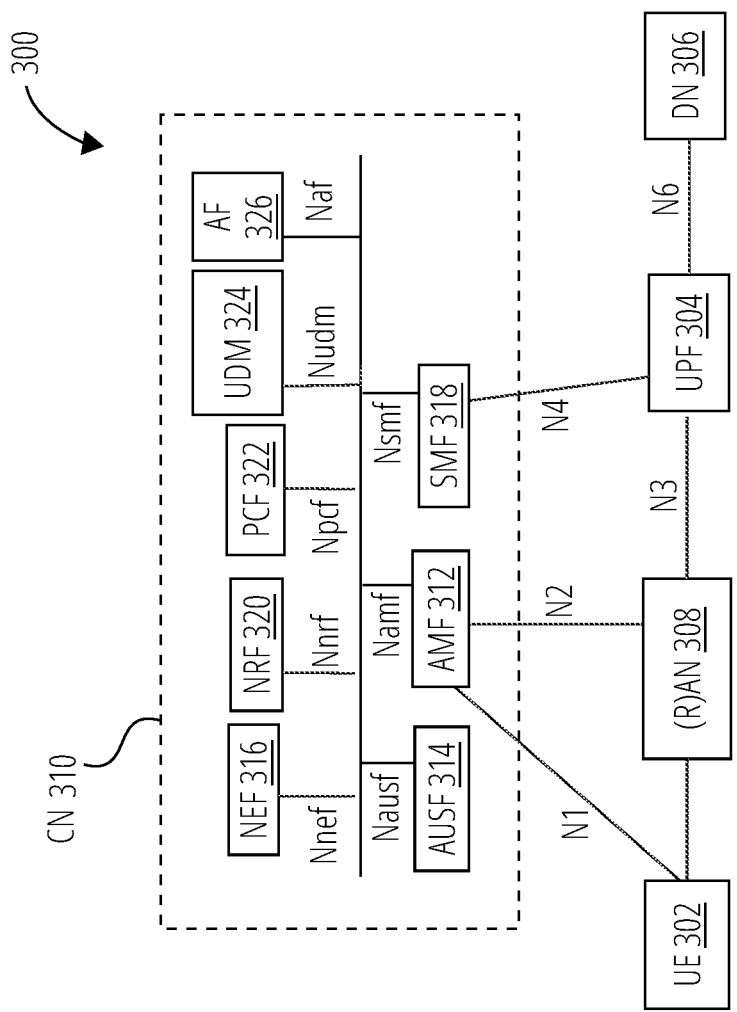
FIG. 3 illustrates a system in accordance with one embodiment.

FIG. 3 illustrates an architecture of a system 300 of a network in accordance with some embodiments. The system 300 is shown to include a UE 302, which may be the same or similar to the UE 202 and the UE 204 discussed previously; a 5G access node or RAN node (shown as (R)AN node 308), which may be the same or similar to the macro RAN node 218 and/or the LP RAN node 220 discussed previously; a User Plane Function (shown as UPF 304); a Data Network (DN 306), which may be, for example, operator services, Internet access or 3rd party services; and a 5G Core Network (5GC) (shown as CN 310).

The CN 310 may include an Authentication Server Function (AUSF 314); a Core Access and Mobility Management Function (AMF 312); a Session Management Function (SMF 318); a Network Exposure Function (NEF 316); a Policy Control Function (PCF 322); a Network Function (NF) Repository Function (NRF 320); a Unified Data Management (UDM 324); and an Application Function (AF 326). The CN 310 may also include other elements that are not shown, such as a Structured Data Storage network function (SDSF), an Unstructured Data Storage network function (UDSF), and the like.

The UPF 304 may act as an anchor point for intra-RAT and inter-RAT mobility, an external PDU session point of interconnect to DN 306, and a branching point to support multi-homed PDU session. The UPF 304 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 304 may include an uplink classifier to support routing traffic flows to a data network. The DN 306 may represent various network operator services, Internet access, or third party services. DN 306 may include, or be similar to the application server 242 discussed previously.

The AUSF 314 may store data for authentication of UE 302 and handle authentication related functionality. The AUSF 314 may facilitate a common authentication framework for various access types.

The AMF 312 may be responsible for registration management (e.g., for registering UE 302, etc.), connection management, reachability management, mobility management, and lawful interception of AMF-related events, and access authentication and authorization. AMF 312 may provide transport for SM messages for the SMF 318, and act as a transparent proxy for routing SM messages. AMF 312 may also provide transport for short message service (SMS) messages between UE 302 and an SMS function (SMSF) (not shown by FIG. 3). AMF 312 may act as Security Anchor Function (SEA), which may include interaction with the AUSF 314 and the UE 302, receipt of an intermediate key that was established as a result of the UE 302 authentication process. Where USIM based authentication is used, the AMF 312 may retrieve the security material from the AUSF 314. AMF 312 may also include a Security Context Management (SCM) function, which receives a key from the SEA that it uses to derive access-network specific keys. Furthermore, AMF 312 may be a termination point of RAN CP interface (N2 reference point), a termination point of NAS (NI) signaling, and perform NAS ciphering and integrity protection.

AMF 312 may also support NAS signaling with a UE 302 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 302 and AMF 312, and relay uplink and downlink user-plane packets between the UE 302 and UPF 304. The N3IWF also provides mechanisms for IPsec tunnel establishment with the UE 302.

The SMF 318 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 318 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 316 may provide means for securely exposing the services and capabilities provided by 3GPP network functions for third party, internal exposure/re-exposure, Application Functions (e.g., AF 326), edge computing or fog computing systems, etc. In such embodiments, the NEF 316 may authenticate, authorize, and/or throttle the AFs. NEF 316 may also translate information exchanged with the AF 326 and information exchanged with internal network functions. For example, the NEF 316 may translate between an AF-Service-Identifier and an internal 5GC information. NEF 316 may also receive information from other network functions (NFs) based on exposed capabilities of other network functions. This information may be stored at the NEF 316 as structured data, or at a data storage NF using a standardized interfaces. The stored information can then be re-exposed by the NEF 316 to other NFs and AFs, and/or used for other purposes such as analytics.

The NRF 320 may support service discovery functions, receive NF Discovery Requests from NF instances, and provide the information of the discovered NF instances to the NF instances. NRF 320 also maintains information of available NF instances and their supported services.

The PCF 322 may provide policy rules to control plane function(s) to enforce them, and may also support unified policy framework to govern network behavior. The PCF 322 may also implement a front end (FE) to access subscription information relevant for policy decisions in a UDR of UDM 324.

The UDM 324 may handle subscription-related information to support the network entities' handling of communication sessions, and may store subscription data of UE 302. The UDM 324 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 322. UDM 324 may also support SMS management, wherein an SMS-FE implements the similar application logic as discussed previously.

The AF 326 may provide application influence on traffic routing, access to the Network Capability Exposure (NCE), and interact with the policy framework for policy control. The NCE may be a mechanism that allows the 5GC and AF 326 to provide information to each other via NEF 316, which may be used for edge computing implementations. In such implementations, the network operator and third party services may be hosted close to the UE 302 access point of attachment to achieve an efficient service delivery through the reduced end-to-end latency and load on the transport network. For edge computing implementations, the 5GC may select a UPF 304 close to the UE 302 and execute traffic steering from the UPF 304 to DN 306 via the N6 interface. This may be based on the UE subscription data, UE location, and information provided by the AF 326. In this way, the AF 326 may influence UPF (re)selection and traffic routing. Based on operator deployment, when AF 326 is considered to be a trusted entity, the network operator may permit AF 326 to interact directly with relevant NFs.

As discussed previously, the CN 310 may include an SMSF, which may be responsible for SMS subscription checking and verification, and relaying SM messages to/from the UE 302 to/from other entities, such as an SMS-GMSC/IWMSC/SMS-router. The SMS may also interact with AMF 312 and UDM 324 for notification procedure that the UE 302 is available for SMS transfer (e.g., set a UE not reachable flag, and notifying UDM 324 when UE 302 is available for SMS).

The system 300 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 300 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 310 may include an Nx interface, which is an inter-CN interface between the MME (e.g., MME(s) 230) and the AMF 312 in order to enable interworking between CN 310 and CN 228.

Although not shown by FIG. 3, the system 300 may include multiple RAN nodes (such as (R)AN node 308) wherein an Xn interface is defined between two or more (R)AN node 308 (e.g., gNBs and the like) that connecting to 5GC 410, between a (R)AN node 308 (e.g., gNB) connecting to CN 310 and an eNB (e.g., a macro RAN node 218 of FIG. 2), and/or between two eNBs connecting to CN 310.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 302 in a connected mode (e.g., CM-CONNECTED) including functionality to manage the UE mobility for connected mode between one or more (R)AN node 308. The mobility support may include context transfer from an old (source) serving (R)AN node 308 to new (target) serving (R)AN node 308; and control of user plane tunnels between old (source) serving (R)AN node 308 to new (target) serving (R)AN node 308.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 4:
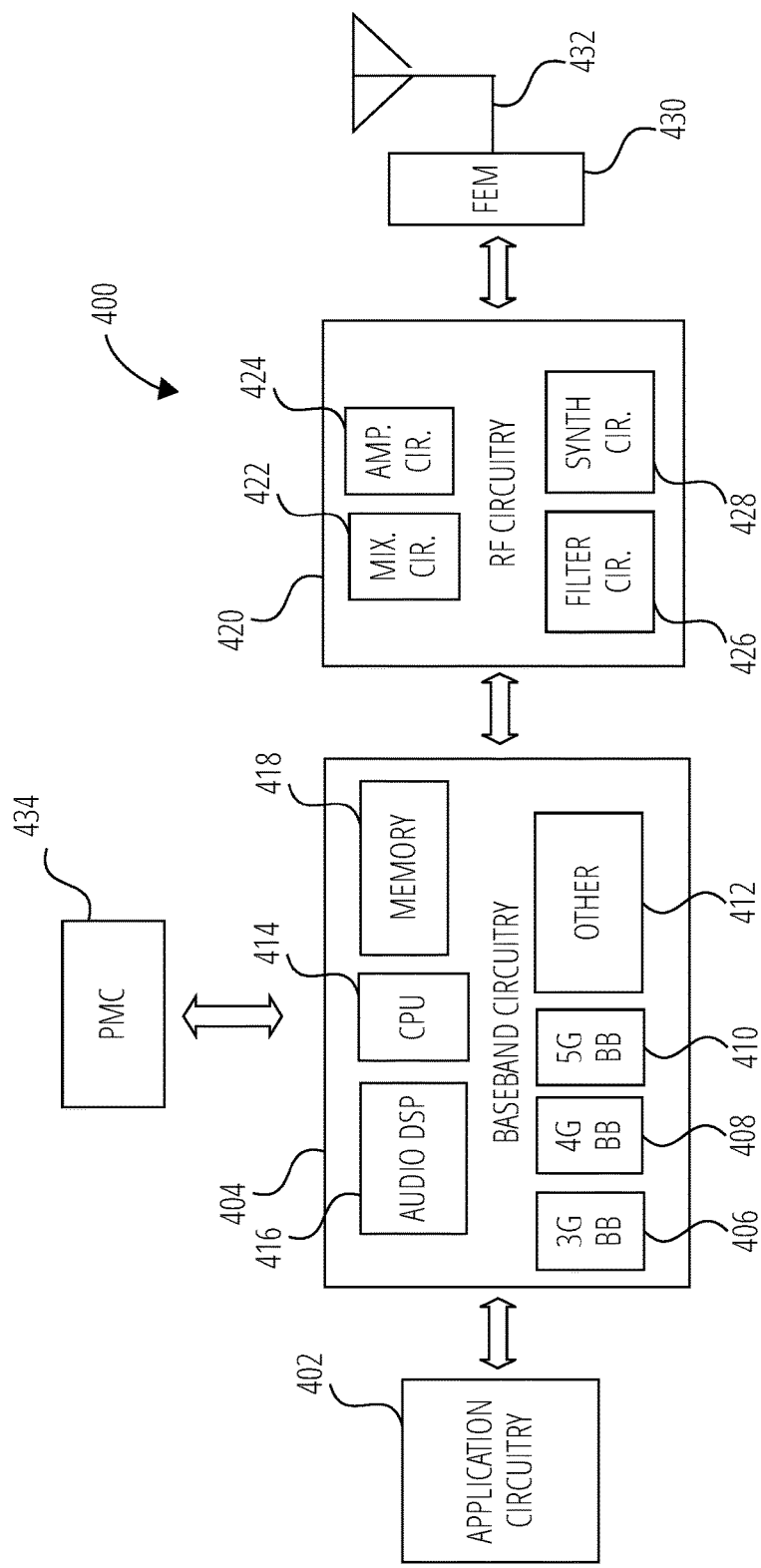
FIG. 4 illustrates a device in accordance with one embodiment.

FIG. 4 illustrates example components of a device 400 in accordance with some embodiments. In some embodiments, the device 400 may include application circuitry 402, baseband circuitry 404, Radio Frequency (RF) circuitry (shown as RF circuitry 420), front-end module (FEM) circuitry (shown as FEM circuitry 430), one or more antennas 432, and power management circuitry (PMC) (shown as PMC 434) coupled together at least as shown. The components of the illustrated device 400 may be included in a UE or a RAN node. In some embodiments, the device 400 may include fewer elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 420 and to generate baseband signals for a transmit signal path of the RF circuitry 420. The baseband circuitry 404 may interface with the application circuitry 402 for generation and processing of the baseband signals and for controlling operations of the RF circuitry 420. For example, in some embodiments, the baseband circuitry 404 may include a third generation (3G) baseband processor (3G baseband processor 406), a fourth generation (4G) baseband processor (4G baseband processor 408), a fifth generation (5G) baseband processor (5G baseband processor 410), or other baseband processor(s) 412 for other existing generations, generations in development or to be developed in the future (e.g., second generation (2G), sixth generation (6G), etc.). The baseband circuitry 404 (e.g., one or more of baseband processors) may handle various radio control functions that enable communication with one or more radio networks via the RF circuitry 420. In other embodiments, some or all of the functionality of the illustrated baseband processors may be included in modules stored in the memory 418 and executed via a Central Processing Unit (CPU 414). The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include a digital signal processor (DSP), such as one or more audio DSP(s) 416. The one or more audio DSP(s) 416 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 404 is configured to support radio communications of more than one wireless protocol may be referred to as multi-mode baseband circuitry.

The RF circuitry 420 may enable communication with wireless networks using modulated electromagnetic radiation through a non-solid medium. In various embodiments, the RF circuitry 420 may include switches, filters, amplifiers, etc. to facilitate the communication with the wireless network. The RF circuitry 420 may include a receive signal path which may include circuitry to down-convert RF signals received from the FEM circuitry 430 and provide baseband signals to the baseband circuitry 404. The RF circuitry 420 may also include a transmit signal path which may include circuitry to up-convert baseband signals provided by the baseband circuitry 404 and provide RF output signals to the FEM circuitry 430 for transmission.

In some embodiments, the receive signal path of the RF circuitry 420 may include mixer circuitry 422, amplifier circuitry 424 and filter circuitry 426. In some embodiments, the transmit signal path of the RF circuitry 420 may include filter circuitry 426 and mixer circuitry 422. The RF circuitry 420 may also include synthesizer circuitry 428 for synthesizing a frequency for use by the mixer circuitry 422 of the receive signal path and the transmit signal path. In some embodiments, the mixer circuitry 422 of the receive signal path may be configured to down-convert RF signals received from the FEM circuitry 430 based on the synthesized frequency provided by synthesizer circuitry 428. The amplifier circuitry 424 may be configured to amplify the down-converted signals and the filter circuitry 426 may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, the mixer circuitry 422 of the receive signal path may comprise passive mixers, although the scope of the embodiments is not limited in this respect.

In some embodiments, the mixer circuitry 422 of the transmit signal path may be configured to up-convert input baseband signals based on the synthesized frequency provided by the synthesizer circuitry 428 to generate RF output signals for the FEM circuitry 430. The baseband signals may be provided by the baseband circuitry 404 and may be filtered by the filter circuitry 426.

In some embodiments, the mixer circuitry 422 of the receive signal path and the mixer circuitry 422 of the transmit signal path may include two or more mixers and may be arranged for quadrature downconversion and upconversion, respectively. In some embodiments, the mixer circuitry 422 of the receive signal path and the mixer circuitry 422 of the transmit signal path may include two or more mixers and may be arranged for image rejection (e.g., Hartley image rejection). In some embodiments, the mixer circuitry 422 of the receive signal path and the mixer circuitry 422 may be arranged for direct downconversion and direct upconversion, respectively. In some embodiments, the mixer circuitry 422 of the receive signal path and the mixer circuitry 422 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 420 may include analog-to-digital converter (ADC) and digital-to-analog converter (DAC) circuitry and the baseband circuitry 404 may include a digital baseband interface to communicate with the RF circuitry 420.

In some dual-mode embodiments, a separate radio IC circuitry may be provided for processing signals for each spectrum, although the scope of the embodiments is not limited in this respect.

In some embodiments, the synthesizer circuitry 428 may be a fractional-N synthesizer or a fractional N/N+1 synthesizer, although the scope of the embodiments is not limited in this respect as other types of frequency synthesizers may be suitable. For example, synthesizer circuitry 428 may be a delta-sigma synthesizer, a frequency multiplier, or a synthesizer comprising a phase-locked loop with a frequency divider.

The synthesizer circuitry 428 may be configured to synthesize an output frequency for use by the mixer circuitry 422 of the RF circuitry 420 based on a frequency input and a divider control input. In some embodiments, the synthesizer circuitry 428 may be a fractional N/N+1 synthesizer.

In some embodiments, frequency input may be provided by a voltage controlled oscillator (VCO), although that is not a requirement. Divider control input may be provided by either the baseband circuitry 404 or the application circuitry 402 (such as an applications processor) depending on the desired output frequency. In some embodiments, a divider control input (e.g., N) may be determined from a look-up table based on a channel indicated by the application circuitry 402.

Synthesizer circuitry 428 of the RF circuitry 420 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 428 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 420 may include an IQ/polar converter.

The FEM circuitry 430 may include a receive signal path which may include circuitry configured to operate on RF signals received from one or more antennas 432, amplify the received signals and provide the amplified versions of the received signals to the RF circuitry 420 for further processing. The FEM circuitry 430 may also include a transmit signal path which may include circuitry configured to amplify signals for transmission provided by the RF circuitry 420 for transmission by one or more of the one or more antennas 432. In various embodiments, the amplification through the transmit or receive signal paths may be done solely in the RF circuitry 420, solely in the FEM circuitry 430, or in both the RF circuitry 420 and the FEM circuitry 430.

In some embodiments, the FEM circuitry 430 may include a TX/RX switch to switch between transmit mode and receive mode operation. The FEM circuitry 430 may include a receive signal path and a transmit signal path. The receive signal path of the FEM circuitry 430 may include an LNA to amplify received RF signals and provide the amplified received RF signals as an output (e.g., to the RF circuitry 420). The transmit signal path of the FEM circuitry 430 may include a power amplifier (PA) to amplify input RF signals (e.g., provided by the RF circuitry 420), and one or more filters to generate RF signals for subsequent transmission (e.g., by one or more of the one or more antennas 432).

In some embodiments, the PMC 434 may manage power provided to the baseband circuitry 404. In particular, the PMC 434 may control power-source selection, voltage scaling, battery charging, or DC-to-DC conversion. The PMC 434 may often be included when the device 400 is capable of being powered by a battery, for example, when the device 400 is included in a UE. The PMC 434 may increase the power conversion efficiency while providing desirable implementation size and heat dissipation characteristics.

FIG. 4 shows the PMC 434 coupled only with the baseband circuitry 404. However, in other embodiments, the PMC 434 may be additionally or alternatively coupled with, and perform similar power management operations for, other components such as, but not limited to, the application circuitry 402, the RF circuitry 420, or the FEM circuitry 430.

In some embodiments, the PMC 434 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used to execute Layer 3, Layer 2, or Layer 1 functionality, while processors of the application circuitry 402 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
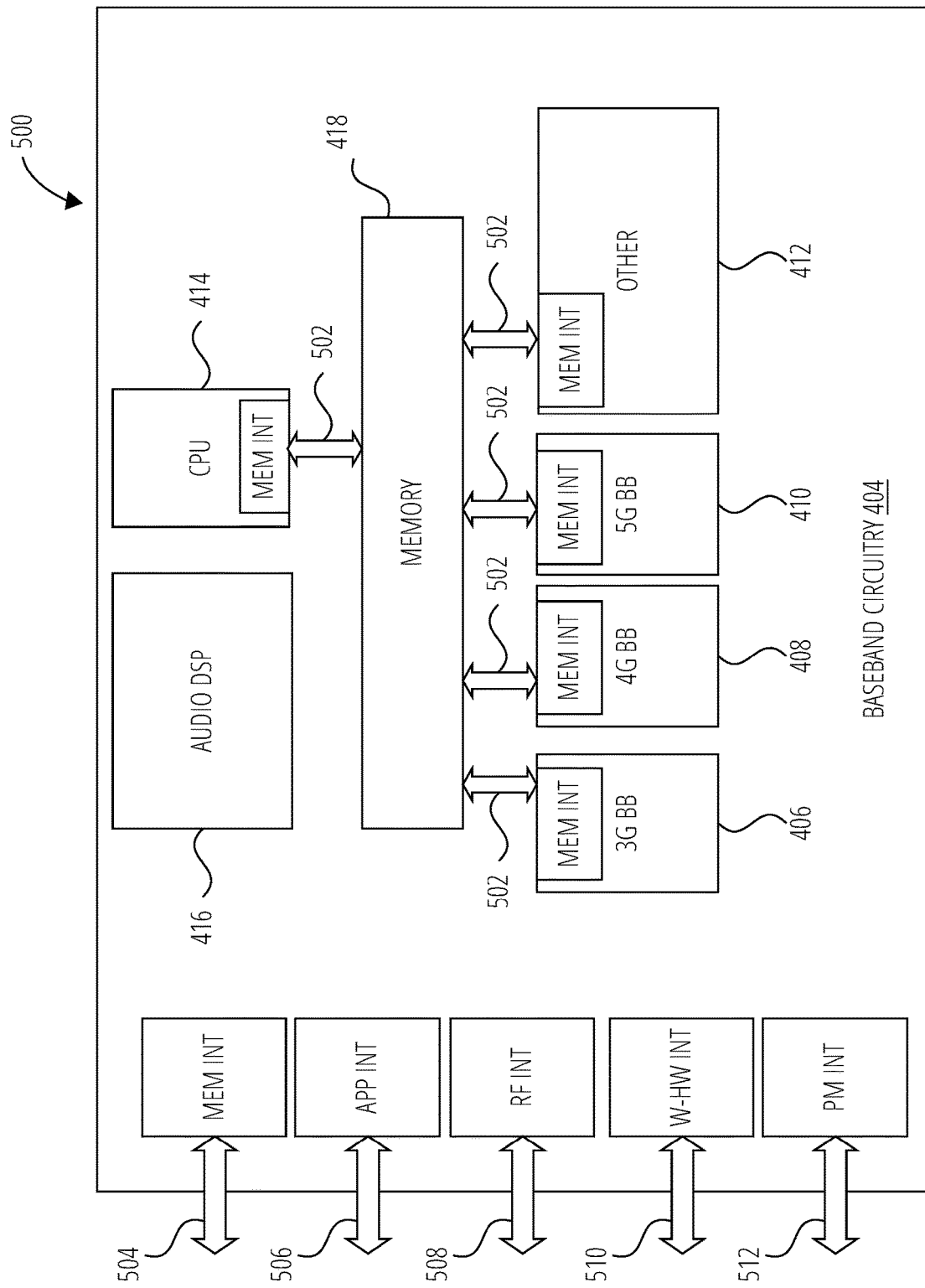
FIG. 5 illustrates an example interfaces in accordance with one embodiment.

FIG. 5 illustrates example interfaces 500 of baseband circuitry in accordance with some embodiments. As discussed above, the baseband circuitry 404 of FIG. 4 may comprise 3G baseband processor 406, 4G baseband processor 408, 5G baseband processor 410, other baseband processor(s) 412, CPU 414, and a memory 418 utilized by said processors. As illustrated, each of the processors may include a respective memory interface 502 to send/receive data to/from the memory 418.

The baseband circuitry 404 may further include one or more interfaces to communicatively couple to other circuitries/devices, such as a memory interface 504 (e.g., an interface to send/receive data to/from memory external to the baseband circuitry 404), an application circuitry interface 506 (e.g., an interface to send/receive data to/from the application circuitry 402 of FIG. 4), an RF circuitry interface 508 (e.g., an interface to send/receive data to/from RF circuitry 420 of FIG. 4), a wireless hardware connectivity interface 510 (e.g., an interface to send/receive data to/from Near Field Communication (NFC) components, Bluetooth® components (e.g., Bluetooth® Low Energy), Wi-Fi® components, and other communication components), and a power management interface 512 (e.g., an interface to send/receive power or control signals to/from the PMC 434.

Figure 6:
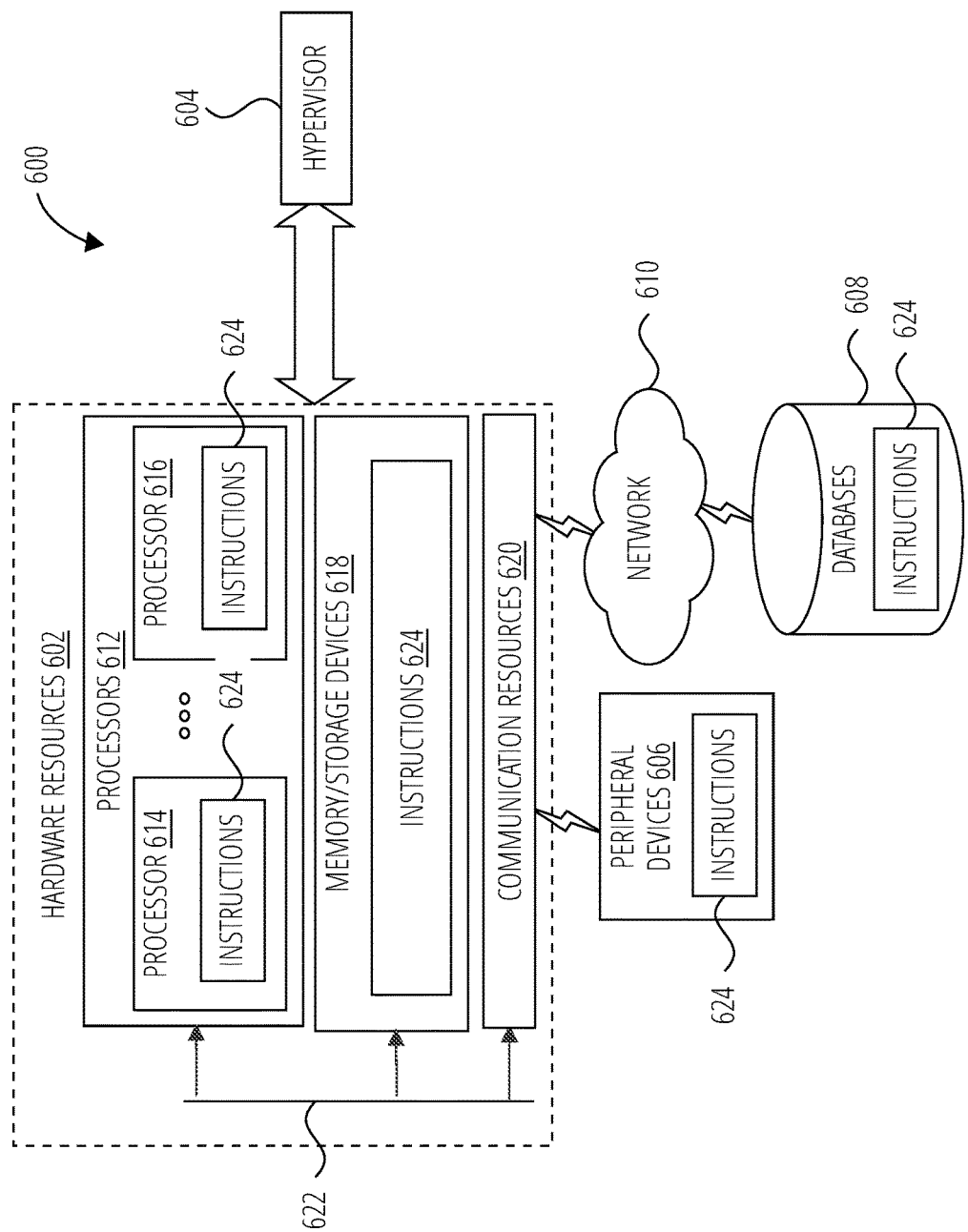
FIG. 6 illustrates components in accordance with one embodiment.

FIG. 6 is a block diagram illustrating components 600, according to some example embodiments, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 602 including one or more processors 612 (or processor cores), one or more memory/storage devices 618, and one or more communication resources 620, each of which may be communicatively coupled via a bus 622. For embodiments where node virtualization (e.g., NFV) is utilized, a hypervisor 604 may be executed to provide an execution environment for one or more network slices/sub-slices to utilize the hardware resources 602.

The processors 612 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 614 and a processor 616.

The memory/storage devices 618 may include main memory, disk storage, or any suitable combination thereof. The memory/storage devices 618 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 620 may include interconnection or network interface components or other suitable devices to communicate with one or more peripheral devices 606 or one or more databases 608 via a network 610. For example, the communication resources 620 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 624 may comprise software, a program, an application, an applet, an app, or other executable code for causing at least any of the processors 612 to perform any one or more of the methodologies discussed herein. The instructions 624 may reside, completely or partially, within at least one of the processors 612 (e.g., within the processor's cache memory), the memory/storage devices 618, or any suitable combination thereof. Furthermore, any portion of the instructions 624 may be transferred to the hardware resources 602 from any combination of the peripheral devices 606 or the databases 608. Accordingly, the memory of the processors 612, the memory/storage devices 618, the peripheral devices 606, and the databases 608 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a non-transitory computer-readable storage medium, the computer-readable storage medium including instructions that when executed by a processor, cause the processor to control derivation of quality of service (QoS) rules in a user equipment (UE) connected to a wireless communication system, the instructions to configure the processor to: flexibly define a scope of packet header fields over which the UE is to perform packet filter derivation; and generate a message for the UE, the message comprising a reflective QoS (RQoS) rule scope field to indicate the scope of the packet header fields over which the UE is to perform the packet filter derivation.

Example 2 is the computer-readable storage medium of Example 1, wherein the instructions further configure the processor to provide the message to the UE upon a protocol data unit (PDU) session establishment or modification.

Example 3 is the computer-readable storage medium of Example 2, wherein the PDU session is of an internet protocol (IP) type, and wherein the RQoS rule scope field indicates to the UE whether the scope includes both a source/destination IP address pair and a source/destination port number pair, or whether the scope only includes the source/destination IP address pair.

Example 4 is the computer-readable storage medium of Example 2, wherein the PDU session is of an Ethernet type, and wherein the RQoS rule scope field indicates to the UE whether the scope includes both a source/destination media access control (MAC) address pair and a tag indicating a membership in a virtual local area network (VLAN) on an Ethernet network, or whether the scope only includes the source/destination MAC address pair.

Example 5 is the computer-readable storage medium of Example 4, wherein the tag comprises an IEEE 802.1Q tag.

Example 6 is the computer-readable storage medium of Example 1, wherein the instructions further configure the processor to process a capability message from the UE, the capability message indicating that the UE supports a flexible scope of packet filters for RQoS for a protocol data unit (PDU) session.

Example 7 is the computer-readable storage medium of Example 6, wherein the instructions further configure the processor to, based at least in part on the capability message, determine whether to use the flexible scope of packet filters for RQoS for the PDU session.

Example 8 is the computer-readable storage medium of Example 7, wherein upon determining to use the flexible scope of packet filters for RQoS for the PDU session, the instructions further configure the processor to: adapt the scope for checking uplink (UL) packets from the UE; and determine which downlink (DL) packets intended for the UE to mark with an RQoS indicator (RQI).

Example 9 is the computer-readable storage medium of Example 8, wherein adapting the scope for checking the UL packets from the UE comprises verifying that the UL packets from the UE include a QoS flow identifier (QFI) applicable to an RQoS service data flow (SDF) only in a first subset of the UL packets that match one or more respective packet filters.

Example 10 is the computer-readable storage medium of Example 9, wherein the instructions further configure the processor to discard a second subset of the UL packets including the QFI that do not match the one or more respective packet filters.

Example 11 is the computer-readable storage medium of Example 8, wherein determining which of the DL packets intended for the UE to mark with the RQI comprises: for a first subset of the DL packets of first service data flows (SDFs) corresponding to a plurality of packet filters of a full scope each including both a source/destination address pair and a source/destination port number pair, marking one or more of the first subset of the DL packets for each different source/destination port number pair used during a corresponding communication session; and for a second subset of the DL packets of second SDFs corresponding to a single packet filter of a reduced scope including only the source/destination address pair, marking one or more of the second subset of the DL packets per source/destination address pair.

Example 12 is a method for a user equipment (UE), the method comprising: generating a capability message for a wireless network, the capability message indicating that the UE supports a flexible scope of packet filters for reflective quality of service (RQoS); processing an RQoS rule scope field from the wireless network, the RQoS rule scope field indicating a scope of packet header fields over which the UE is to perform packet filter derivation; and deriving uplink (UL) packet filters based on the scope of the packet header fields.

Example 13 is the method of Example 12, further comprising: processing downlink (DL) packets from the wireless network, wherein a subset of the DL packets include an RQoS indicator (RQI); and for the DL packets in the subset of DL packets that include the RQI, generating UL packets based on the UL packet filters with headers including a quality of service flow identifier (QFI) applicable to an RQoS service data flow (SDF).

Example 14 is the method of Example 12, further comprising including the capability message in a protocol data unit (PDU) session establishment request message.

Example 15 is the method of Example 12, wherein the RQoS rule scope field is received during a protocol data unit (PDU) session establishment or modification procedure.

Example 16 is the method of Example 15, wherein the PDU session is of an internet protocol (IP) type, and wherein the RQoS rule scope field indicates to the UE whether the scope includes both a source/destination IP address pair and a source/destination port number pair, or whether the scope only includes the source/destination IP address pair.

Example 17 is the method of Example 15, wherein the PDU session is of an Ethernet type, and wherein the RQoS rule scope field indicates to the UE whether the scope includes both a source/destination media access control (MAC) address pair and a tag indicating a membership in a virtual local area network (VLAN) on an Ethernet network, or whether the scope only includes the source/destination MAC address pair.

Example 18 is the method of Example 17, wherein the tag comprises an IEEE 802.1Q tag.

Example 19 is an apparatus including a processor and a memory storing instructions that, when executed by the processor, configure the apparatus to perform the method of any of Examples 12-18.

Example 20 is a non-transitory computer-readable storage medium including instructions that, when processed by a computer, configure the computer to perform the method of any of Examples 12-18.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), the method comprising:
generating a capability message for a wireless network, the capability message indicating that the UE supports a flexible scope of packet filters for reflective quality of service (RQoS);
receiving an RQoS rule scope field during a protocol data unit (PDU) session establishment or modification procedure, wherein the PDU session is of an internet protocol (IP) type, and wherein the RQoS rule scope field indicates to the UE whether the scope includes both a source/destination IP address pair and a source/destination port number pair, or whether the scope only includes the source/destination IP address pair;
processing the RQoS rule scope field from the wireless network, the RQoS rule scope field indicating a scope of packet header fields over which the UE is to perform packet filter derivation; and
deriving uplink (UL) packet filters based on the scope of the packet header fields.

2. The method of claim 1, further comprising:
processing downlink (DL) packets from the wireless network, wherein a subset of the DL packets includes an RQoS indicator (RQI); and
for the subset of the DL packets that includes the RQI, generating UL packets based on the UL packet filters with headers including a quality of service flow identifier (QFI) applicable to an RQoS service data flow (SDF).

3. The method of claim 1, further comprising including the capability message in a PDU session establishment request message.

4. At least one non-transitory computer-readable storage medium of a user equipment (UE), the non-transitory computer-readable medium having computer-readable instructions stored thereon, the computer-readable instructions configured to instruct one or more processor of the UE to:
    generate a capability message for a wireless network, the capability message indicating that the UE supports a flexible scope of packet filters for reflective quality of service (RQoS);
    receive an RQoS rule scope field during a protocol data unit (PDU) session establishment or modification procedure, wherein the PDU session is of an Ethernet type, and wherein the RQoS rule scope field indicates to the UE whether the scope includes both a source/destination media access control (MAC) address pair and a tag indicating a membership in a virtual local area network (VLAN) on an Ethernet network, or whether the scope only includes the source/destination MAC address pair;
    process the RQoS rule scope field from the wireless network, the RQoS rule scope field indicating a scope of packet header fields over which the UE is to perform packet filter derivation; and
    derive uplink (UL) packet filters based on the scope of the packet header fields.

5. The at least one non-transitory computer-readable storage medium of claim 4, wherein the computer-readable instructions are further configured to:
    process downlink (DL) packets from the wireless network, wherein a subset of the DL packets includes an RQoS indicator (RQI); and
    for the subset of the DL packets that includes the RQI, generate UL packets based on the UL packet filters with headers including a quality of service flow identifier (QFI) applicable to an RQoS service data flow (SDF).

6. The at least one non-transitory computer-readable storage medium of claim 4, wherein the computer-readable instructions are further configured to include the capability message in a PDU session establishment request message.

7. The at least one non-transitory computer-readable storage medium of claim 4, wherein the tag comprises an IEEE 802.1Q tag.

8. An apparatus of a user equipment (UE), the apparatus comprising:
    one or more processors configured to:
        generate a capability message for a wireless network, the capability message indicating that the UE supports a flexible scope of packet filters for reflective quality of service (RQoS);
        receive an RQoS rule scope field during a protocol data unit (PDU) session establishment or modification procedure, wherein the PDU session is of an internet protocol (IP) type, and wherein the RQoS rule scope field indicates to the UE whether the scope includes both a source/destination IP address pair and a source/destination port number pair, or whether the scope only includes the source/destination IP address pair;
        process the RQoS rule scope field from the wireless network, the RQoS rule scope field indicating a scope of packet header fields over which the UE is to perform packet filter derivation; and
        derive uplink (UL) packet filters based on the scope of the packet header fields.

9. The apparatus of claim 8, wherein the one or more processors are further configured to:
    process downlink (DL) packets from the wireless network, wherein a subset of the DL packets includes an RQoS indicator (RQI); and
    for the subset of the DL packets that includes the RQI, generate UL packets based on the UL packet filters with headers including a quality of service flow identifier (QFI) applicable to an RQoS service data flow (SDF).

10. The apparatus of claim 8, wherein the one or more processors are further configured to include the capability message in a PDU session establishment request message.

* * * * *